United States Patent [19]
Landgraf

[11] Patent Number: 5,644,637
[45] Date of Patent: Jul. 1, 1997

[54] METHOD AND APPARATUS FOR RECOVERING SYNCHRONIZING SIGNALS IN SCRAMBLED TELEVISION PICTURES

[75] Inventor: Henry Sebastian Landgraf, Cherry Hill, N.J.

[73] Assignee: General Instrument Corporation of Delaware, Hatboro, Pa.

[21] Appl. No.: 534,723

[22] Filed: Sep. 27, 1995

[51] Int. Cl.$^6$ .................................................. H04N 7/167
[52] U.S. Cl. .................................................. 380/15; 380/10
[58] Field of Search ................................. 380/9, 10, 15, 380/19, 20

[56] References Cited

U.S. PATENT DOCUMENTS

| | | |
|---|---|---|
| 4,064,536 | 12/1977 | Saeki et al. ........................... 380/15 X |
| 4,703,354 | 10/1987 | Auld, Jr. et al. ........................ 380/15 X |
| 4,706,285 | 11/1987 | Rumreich ............................. 380/10 X |

Primary Examiner—Bernarr E. Gregory
Attorney, Agent, or Firm—Irwin Ostroff; Edward Brandeau

[57] ABSTRACT

Suppressed synchronizing signals of a scrambled standard TV picture are recovered and the picture unscrambled by a method including the steps of: separating a video portion having suppressed sync signals from an audio portion of a TV picture at an intermediate frequency level, amplifying the video portion through a gain controlled amplifier, selectively compensating for the suppressed levels of sync signals, passing the video portion with recovered sync signals of the TV picture through a demodulator, and providing a feedback signal from the demodulator to the gain controlled amplifier to automatically control its gain and thereby minimize artifacts in the TV picture after sync recovery. This new method is easily carried out by apparatus using only a few standard circuit components which can be manufactured as an application specific integrated circuit (ASIC).

12 Claims, 4 Drawing Sheets

FIG. 6

METHOD AND APPARATUS FOR RECOVERING SYNCHRONIZING SIGNALS IN SCRAMBLED TELEVISION PICTURES

FIELD OF THE INVENTION

This invention relates to improved method and apparatus for restoring to normal levels the synchronizing (sync) signals of television pictures which have been scrambled (to prevent unauthorized viewing) by suppressing the levels of the sync signals.

BACKGROUND OF THE INVENTION

Cable TV systems, of which there are over 10,000 in the United States, serve customers on a paid subscription basis. A cable system operator customarily restricts access to some of the TV channels being sent to each customer depending on which channels or programs the customer pays to receive. Access by a customer to the various channels available in a cable TV system is controlled by means of respective subscriber terminal addresses and access codes sent to each subscriber terminal from a central office over the cable along with the television signals. Each subscriber location is provided by the cable operator with a special subscription TV receiver (subscriber terminal) having a unique address that is normally leased to the customer on a monthly basis. The receiver is owned and controlled by the cable TV operator. To prevent non-authorized access to one or more of the many TV channels being simultaneously transmitted over the cable, the cable TV operator typically uses not only subscriber terminal address and channel access codes, but also employs some kind of proprietary coding system for scrambling and descrambling the actual television pictures of some of the channels. Typically, the picture of a TV channel is individually scrambled at a central office and then individually descrambled by circuitry in the receiver at each subscriber location. Each receiver receives from the central office coded data signals which instruct the respective receivers to descramble (or not) those TV channels for which access is authorized (or not). Thus TV channel access on a subscriber-by-subscriber subscriber basis is easily controlled electronically by the cable TV operator from the central office.

A very effective and widely used way of scrambling a TV picture is to suppress the synchronizing signals which are a normal part of commercial TV broadcasts. In the United States television signals broadcast over their respective channels have synchronizing signals and line video signals in accordance with the standards set by the National Television Standards Committee (NTSC). There are 525 horizontal lines in each frame of a video picture, each frame having 262½ lines in an "odd" field interleaved with 262½ lines in an "even" field. Between the end of an even field and the beginning of an odd field there is a corresponding vertical blanking interval of 20 lines duration, and between the end of each odd field another similar but not identical vertical blanking interval of 20 lines duration. There remain 485 horizontal lines of video of each frame which are not blanked out during the vertical intervals, though some of these lines (i.e., at the beginning and end of the frame) are not customarily displayed on a standard TV receiver. This picture format is well known and need not be described further.

Each of the horizontal lines of a video picture comprises a first or horizontal blanking interval (HBI) during which a horizontal line sync pulse and a color burst signal are provided. The remainder of the line is an active video (AV) portion during which color picture information is transmitted. The horizontal sync pulse serves to synchronize a horizontal sweep circuit in a TV receiver (as is well known) and the color burst signal provides synchronizing of the luminance and chromanace circuits of the receiver (also well known). Ordinarily during the HBI, the line video is blanked out and no indication of the presence of the synchronizing signals is evident in the picture displayed on the screen of the TV receiver.

Scrambling of a TV picture can be accomplished very effectively by suppressing the horizontal sync signals thus rendering a TV receiver unable to display a proper picture. In the absence of the necessary timing and sequencing of the horizontal lines of the fields and frame of a TV picture provided by the synchronizing signals, the picture becomes a visual jumble of bits and pieces. To view the picture properly it is necessary to restore the horizontal sync pulses to standard levels.

Circuits which suppress sync signals in a TV picture in order to scramble it are well known in the art. Broadcast equipment embodying such a circuit is located at a central office of a cable TV operator, for example, and is used to scramble restricted TV channels before they are transmitted to subscriber locations. Securely coded control signals generated as part of scrambling are also sent to subscriber locations from the central office. These coded signals enable only the receivers of those subscribers who pay to receive a restricted channel or channels to descramble them for proper viewing. There may be thousands of subscribers in a given cable TV system and therefore it is economically important to the cable system operator that only authorized subscribers have access to the restricted channels and be able to view properly the scrambled pictures.

There are various arrangements previously used to recover suppressed sync signals in a scrambled TV picture. Several of these arrangements will be described in greater detail hereinafter in order to better show the advantages in performance, fidelity and cost obtained by the present invention. While relatively little equipment is needed at a central office of a cable TV system in order to scramble pictures being broadcast, there are needed thousands of receivers, at least one for each subscriber location, able to descramble the pictures. The cable TV operator can afford to spend a substantial sum of money for the equipment at the central office since relatively speaking only a small amount is required. Hence for that equipment there need be no tradeoff in performance and fidelity versus cost. The scrambling equipment can be as good as it needs to be and cost is a secondary consideration. On the other hand each subscriber descrambling receiver, since there may be thousands of them, must be produceable at reasonably low cost (e.g., a hundred dollars or less). Cost factors made it usual, prior to the present invention, to accept certain limitations in performance and fidelity in operation of descrambling equipment to achieve a cost objective.

In recent years, the fidelity and technical quality of commercial TV receivers, of video pictures themselves, and of the distribution networks of cable TV systems have significantly improved. What was thought to be "good" in picture reproduction a few years ago is now seen to have problems of noise, of distortion, and of similar artifacts relating to scrambling and descrambling. The human eye is very sensitive to imperfections in the images it sees. For example, measured against a one volt peak to peak video signal of an image, distortions and other artifacts in the signal of only a few millivolts may be objectionable to a viewer of the image as reproduced on the screen of a high quality TV receiver. Because of cost limitations, previous descrambling arrangements often produce low level, though visually evident artifacts in TV pictures they descramble. It is therefore desirable to provide a descrambling method and apparatus which are economical to employ and which reproduce video images with virtually the same fidelity as the original not-scrambled images. The present invention provides such method and apparatus.

SUMMARY OF THE INVENTION

Suppressed synchronizing signals of a scrambled standard TV picture are recovered and the picture unscrambled by a new method provided in accordance with one aspect of the invention. The method comprises the steps of separating a video portion having suppressed sync signals from an audio portion of a TV picture at an intermediate frequency level, amplifying the video portion through a gain controlled amplifier, compensating for the suppressed levels of sync signals by amplifying them to the degree they have been suppressed, passing the video portion with recovered sync signals of the TV picture through a demodulator, and providing a feedback signal from the demodulator to the gain controlled amplifier to automatically control its gain and thereby minimize artifacts in the TV picture after sync recovery. This sequence of steps avoids intermodulation of audio and video signals during sync recovery, and minimizes noise, distortion and other artifacts in the video image caused by sync recovery as compared to other methods. The implementation of this new method is easily accomplished using relatively few standard components. A sync recovery circuit operating according to this new method can easily be manufactured as an application specific integrated circuit (ASIC). This reduces cost and minimizes the number of separate components required as compared to previous arrangements.

In accordance with another aspect of the invention, there is provided a method of recovering suppressed sync signals in scrambled TV pictures in order to descramble them. The method comprises the steps of: amplifying line video signals of TV pictures through a gain controlled amplifier; selectively compensating for suppressed levels of sync signals of the line video signals to the degree the sync signals have been suppressed; passing the line video signals with recovered sync signals of the TV picture through a demodulator; and providing a feedback signal from the demodulator to the gain controlled amplifier to automatically control its gain and thereby minimize artifacts in the TV pictures after sync recovery.

In accordance with yet another aspect of the invention, there is provided apparatus for recovering suppressed sync signals in scrambled TV pictures in order to descramble them. This apparatus comprises: gain controlled amplifier means adapted to receive line video signals of TV pictures, sync recovery means coupled to the amplifier means for selectively compensating for suppressed levels of sync signals of the line video signals to the degree the sync signals have been suppressed, demodulator means coupled to the sync recovery means for receiving the line video signals with recovered sync signals of the TV picture, and feedback means for providing a feedback signal from the demodulator means to the gain controlled amplifier means to automatically control its gain and thereby minimize artifacts in the TV pictures after sync recovery.

The invention will be better understood from the following more detailed description taken with the accompanying drawings.

DETAILED DESCRIPTION

Figure 1:
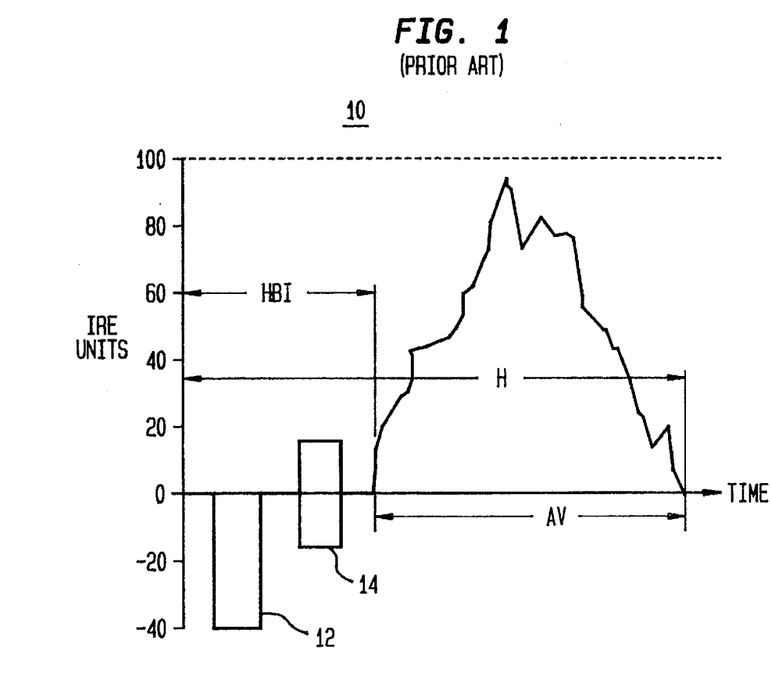
FIG. 1 is a schematic illustration of a waveform of one horizontal line of a standard (i.e., not scrambled) video signal of a standard TV picture.

Referring now to FIG. 1, there is shown not exactly to scale a waveform 10, with amplitude in IRE units along a vertical axis and time along a horizontal axis, of a single line H of a standard (i.e., not scrambled) video signal of a standard (e.g., NTSC) TV picture. Signal amplitude is shown vertically in standard IRE units from −40 to +100, a range representing a 1 volt peak-to-peak signal, with "0" IRE being the blanking level (as is well known in the art). A horizontal blanking interval (HBI) is as indicated. The waveform 10 has a standard horizontal blanking and sync pulse 12, with a negative amplitude of −40 IRE units relative to "0" IRE, a standard "color burst" signal 14, and an active video (AV) picture portion with a variable positive amplitude of 0 to about +100 IRE units. All of these details are well known in the art. It should be understood that the waveform 10 represents a video signal at baseband frequency, whereas TV pictures, as is well known, are broadcast on radio frequency (RF) carriers amplitude modulated by respective baseband video signals, such as illustrated by the waveform 10.

Figure 2:
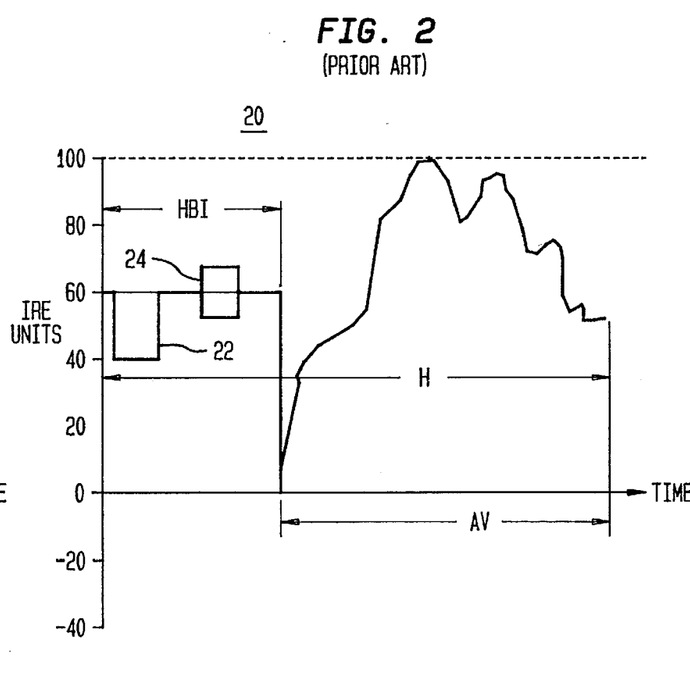
FIG. 2 is a schematic illustration of a waveform similar to that of FIG. 1 but with its horizontal sync pulse suppressed to scramble the TV picture.

Referring now to FIG. 2, there is shown not exactly to scale, a waveform 20 of a horizontal line H of a video signal similar to the waveform 10 in FIG. 1 but with horizontal sync signals suppressed in order to scramble the TV picture. Amplitude in IRE units is shown along a vertical scale and time along a horizontal scale. The waveform 20 has a horizontal blanking interval HBI, within which there is a horizontal sync pulse 22 and a color burst signal 24, and an active video (AV) portion. The horizontal sync pulse 22 is shown suppressed to an amplitude of −20 IRE units and is positioned between +60 and +40 IRE units on the vertical scale. This represents a −6 dB (decibel) suppression of the sync pulse 22 relative to a standard of −40 IRE units as indicated by the pulse 12 of FIG. 1. A horizontal sync pulse 22 may alternatively be suppressed by more than the −6 dB illustrated, as will be explained hereinafter. Before the active video (AV) portion of the waveform 20 can be properly displayed on a standard TV receiver, it is necessary to restore the ratio of the peak level of the sync pulse 22 to a standard value relative to the peak level of the AV portion of the line H, namely a ratio of −40 to +100, not necessarily in IRE units. To re-establish standard IRE levels, once the relative levels are properly set, it is only necessary to adjust the gain of an amplifier. It is desirable that recovery of the sync pulse 22 not produce noise, distortion, or artifacts in the active video (AV) portion of the waveform 20, as was previously explained. The present invention provides an effective yet inexpensive way of recovering the suppressed sync pulses.

It is to be understood that the sync pulses in lines 1–21 (not shown) occurring during a vertical blanking interval (VBI) can be suppressed as a block and then restored to normal levels in the same way as the horizontal sync pulses 22. This is well known in the art and will not be described further.

Figures 3, 4:
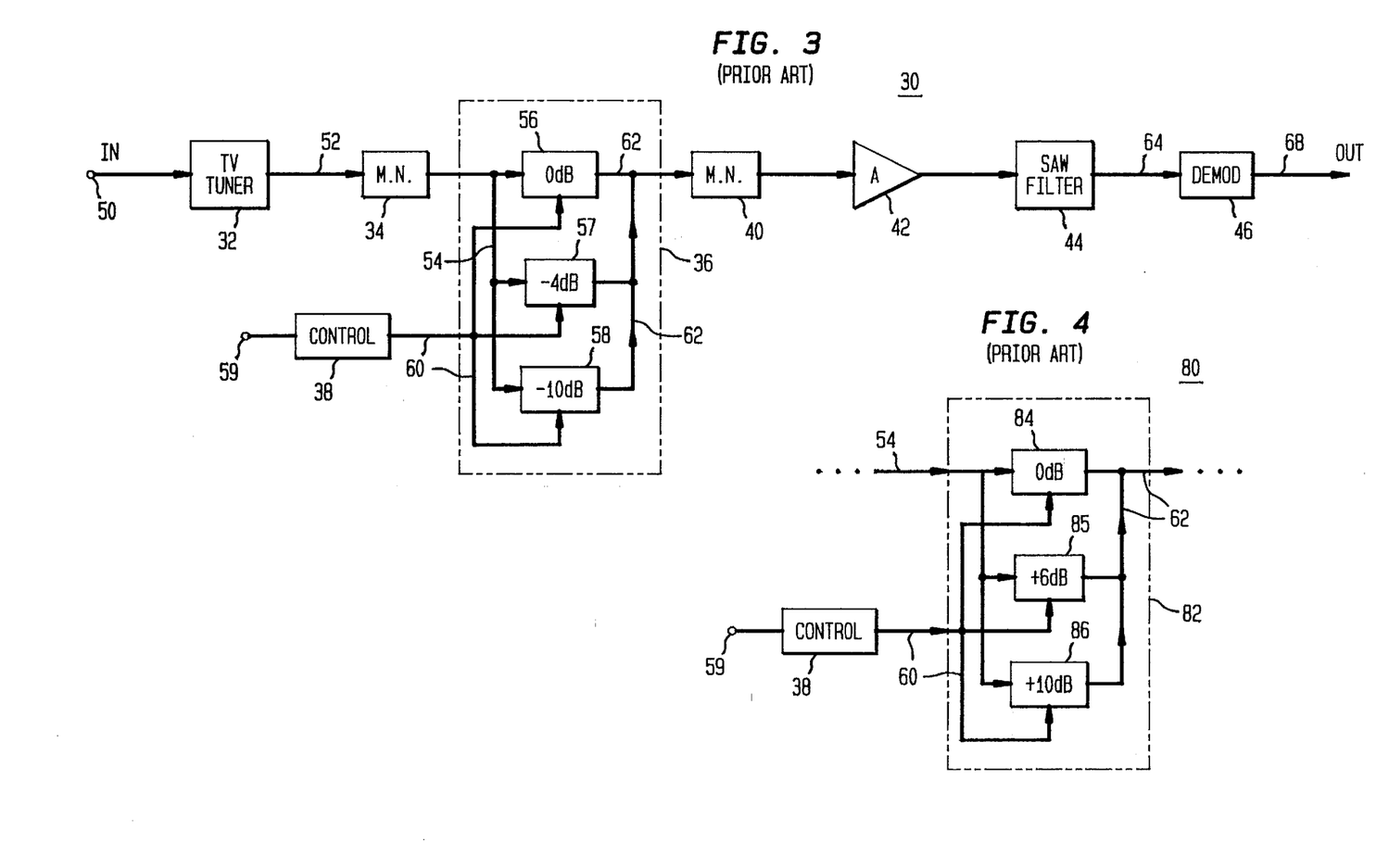
FIG. 3 is a schematic block diagram of a prior-art descrambling sync recovery circuit.
FIG. 4 is a portion of a schematic block diagram of another prior-art descrambling sync recovery circuit similar to that of FIG. 3.

Referring now to FIG. 3, there is shown a prior-art circuit 30 for descrambling TV pictures which have been scrambled by sync suppression. The circuit 30 may be part of a receiver (not shown) provided by the cable system operator to each subscriber. The circuit 30 comprises a TV tuner 32, an impedance matching network (MN) 34, a sync level and video signal compensating arrangement 36 (shown within a dashed line box), a control unit 38, an impedance matching network (MN) 40, an amplifier 42, a surface acoustic wave (SAW) filter 44, and a demodulator 46.

The TV tuner 32 has an input 50 which receives (e.g., via a cable not shown) various TV channels being broadcast at radio frequency (RF) level. The tuner 32 after selecting a desired RF channel applies to a lead 52 at intermediate frequency (IF) level (e.g., a modulated carrier of intermediate frequency in the 40 $MH_z$ range) audio and video portions of a TV picture, which may or may not be scrambled. The lead 52 applies the picture signals (video and audio) to the matching network 34 (well known in the art for matching impedances) which via a branched lead 54 applies the picture signals to the compensating arrangement 36. The arrangement 36 comprises a module 56, a module 57, and a module 58, each of which receives picture signals (scrambled or not) via the branched lead 54. Each of the modules 56, 57, and 58 is selectively controlled via a branched lead 60 by signals from the control unit 38.

The control unit 38 (well known in the art) receives coded signals at an input 59 via a path (such as a cable, not shown) from a central office. These coded signals are sent along with the TV pictures to each subscriber location. These coded signals enable a respective circuit 30 to descramble (or not) those TV pictures for which access is authorized (or not). By way of example here, there are illustrated three levels of sync suppression, namely 0 dB (i.e., none), –6 dB, and –10 dB, respectively. The module 56 of the arrangement 36, when activated by signals from the control unit 38 via the branched lead 60, applies a 0 dB loss (unity gain) selectively to a portion of each video line H on the lead 54. This occurs during the HBI portion of a video line H having a sync pulse already suppressed by –10 dB. The module 56, after providing a 0 dB loss (unity gain) to this sync pulse, is then actuated during the AV portion of this line H by the control unit 38 to provide a –10 dB loss to the active video (AV) portion of the line H. Thus both the horizontal sync pulse and the AV portion of that line H appear attenuated equally by –10 dB. In other words, the sync pulse has been recovered by restoring to a standard ratio (no longer in IRE units) the peak sync pulse level relative to a reference zero level as compared to the peak level of the AV portion of the line H relative to the reference zero level. The video line H thus descrambled for proper viewing, though attenuated by –10 dB, is applied to a common lead 62 at the output of the module 56 and thence to the impedance matching network (MN) 40. The module 56 can be a simple diode-resistor network as is well known in the art.

In similar fashion, where sync pulses are suppressed at the central office by –6 dB, the control unit 38 actuates the module 57 during HBI of each line H, and the sync pulse (already suppressed by –6 dB) of each line H is further attenuated by –4 dB to give a total attenuation of –10 dB. The module 57 after providing a –4 dB loss during HBI, is actuated by the control unit 38 during the AV portion of that line H to provide a –10 dB loss to the active video (AV) portion of the line H. Thus the horizontal sync pulse and the active video (AV) portion of that line H both appear attenuated by –10 dB and are applied to the common lead 62. The module 57 can be a simple diode-resistor network as is well known in the art.

Where sync pulses are not suppressed (0 dB) at the central office, the control unit 38 actuates the module 58 during the HBI portion of a line H and the sync pulse of that line H is attenuated by –10 dB. The module 58 is then actuated by the control unit 38 during the AV portion of the line H to also provide –10 dB attenuation. The now descrambled line H, attenuated with sync pulse and AV portion by –10 dB, is then applied to the common lead 62. The module 58 can be a diode-resistor network as is well known in the art.

Regardless of whether sync pulses have been suppressed or not at the central office (i.e., by 0 dB, –6 dB, or –10 dB), "descrambled" line video signals, with "recovered" sync pulses in proper ratio, are obtained on the common lead 62 through the various "negative" gains (losses) selectively provided by the compensating arrangement 36. The output of the MN 40 is applied to the preamplifier (A) 42 and thence to the surface acoustic wave (SAW) filter 44 where, as is well known in the art, audio at IF level is separated from the video portion of the TV picture. These audio and video signals are separately fed via a multiple signal path 64 to the demodulator 46. An output 68 of the demodulator 46 may be utilized in a standard TV receiver (not shown) to show the TV pictures along with the audio, as is well known.

The prior-art circuit 30 is relatively straightforward in operation and the compensating arrangement 36 requires only simple diodes and resistors. However, the compensating arrangement 36 requires a relatively large number of parts (diodes and resistors) and each module 56, 57, and 58 must be adjusted for its desired level of attenuation. In operation, the arrangement 36 attenuates or throws away active video (AV) signal levels (i.e., by –10 dB) in order to compensate for suppressed sync levels. This in turn introduces low levels of noise and possible distortion into the output video signals on the common lead 62. Since both the audio and video portions of a TV picture at IF level pass through the compensating arrangement 36, some additional distortion may result. These artifacts may be objectionable in the video pictures when viewed.

Referring now to FIG. 4, there is shown in schematic block diagram of a portion only of another prior-art descrambling sync recovery circuit 80 which is similar to the circuit 30 of FIG. 3. Elements of the circuit 80 which are not shown can be identical to corresponding ones in the circuit 30 of FIG. 3 and will be referred to using the same respective reference numbers as applied to the circuit 30. The operation of the circuit 80 is generally similar to that of the circuit 30 but with important differences now to be described. The circuit 80 comprises, in addition to elements not shown, a control unit 38 (see also FIG. 3) and a sync pulse amplification arrangement 82 shown within a dashed line box. The arrangement 82 is connected via a branched lead 54 to receive TV picture signals at IF level from an impedance matching network (not shown, but identical to the MN 34 of the circuit 30). The arrangement 82 is controlled by signals via a branched lead 60 from the control unit 38. Output line video signals from the arrangement 82 with sync pulses restored to standard level (see FIG. 1), are applied to a common lead 62 and thence to another impedance matching network (not shown but identical to the MN 40 of the circuit 30).

The arrangement 82 comprises a module 84, a module 85 and a module 86, each connected to the respective leads 54, 60 and 62 as shown. The modules 84, 85 and 86 are selectively controlled by the control unit 38 as follows. When a line H of a video signal with its sync pulse not suppressed (0 dB) appears on the branched lead 54, the control unit 38 actuates the module 84 during the HBI portion of the line H to apply unity gain (0 dB) to the sync pulse (already at standard level). Then during the AV portion of the line H, the control unit 38 actuates the module 84 to also provide unity gain (0 dB). Thus the module 84 passes onto the output branched lead 62 the entire video signal line H at unity gain, the sync pulse not having been suppressed in the first place. Thereafter the "descrambled" line H is processed in the circuit 80 as described previously in connection with the circuit 30 (FIG. 3). The module 84 can be a unity gain amplifier well known in the art.

When a line H of a video signal has its sync pulse suppressed by −6 dB, the module 85 is actuated during HBI by the control unit 38 to apply +6 dB gain to the sync signal, but is actuated during the AV portion of the line H to apply unity gain (0 dB) to this portion of the line H. Thus the module 85 outputs to the common lead 62 a descrambled video line H with sync pulse restored to standard. The module 85 can be a 0 dB and a +6 dB controllable gain amplifier well known in the art.

Similarly where a line H of a video signal has its sync pulse suppressed by −10 dB, the module 86 is actuated by the control unit 38 during HBI to provide a +10 dB gain, and is actuated during the AV portion of the line H to provide unity gain (0 dB). Thus a descrambled video signal line H is provided by the module 86 and applied to the common lead 62. The module 86 can be a 0 dB and +10 dB controllable gain amplifier well known in the art.

The arrangement 82 selectively applies gain to HBI portions of video signal lines H, rather than attenuating the AV portions (as in the arrangement 36 of FIG. 3), in order to recover suppressed sync signals. This positive mode of sync recovery by the circuit 80 and its amplification arrangement 82 avoids introducing added amplifier noise into the active video portions of a descrambled TV picture. But this prior-art circuit 80 has a limited dynamic range which under certain conditions causes other noise and distortion problems. The audio and video portions at IF level of a TV picture are both processed through the arrangement 82.

Figure 5:
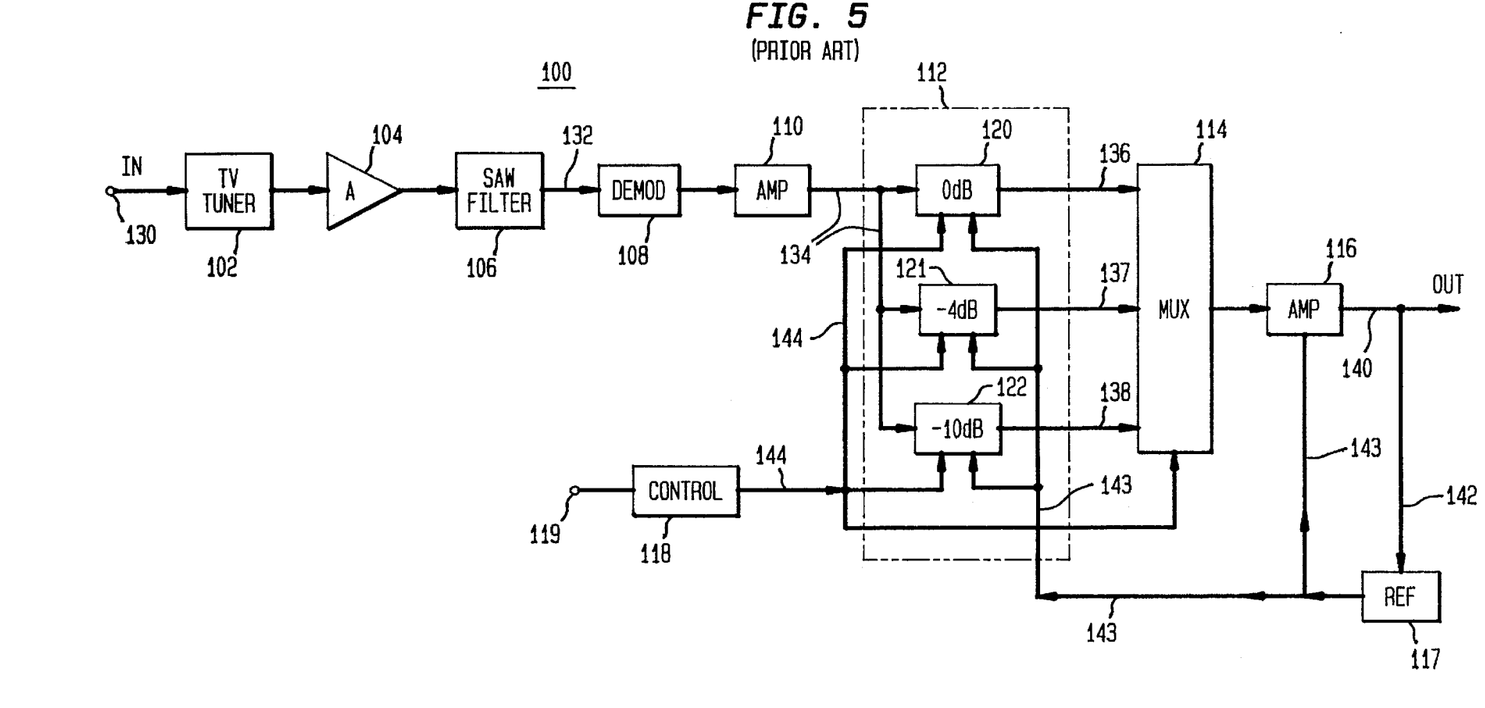
FIG. 5 is a schematic block diagram of yet another prior-art descrambling sync recovery circuit.

Referring now to FIG. 5, there is shown a schematic block diagram of yet another prior-art descrambling sync recovery circuit generally indicated at 100. The circuit 100, which may be part of a receiver (not shown), comprises a TV tuner 102, a preamplifier (A) 104, a SAW filter 106, a demodulator (DEMOD) 108, a video amplifier (AMP) 110, a sync level compensating arrangement 112 (shown within a dashed line box), a multiplex (MUX) unit 114, an amplifier 116, and a reference level unit (REF) 117, and a control unit 118. Within the compensating arrangement 112 are a module 120, a module 121 and a module 122. The arrangement 112, and its respective modules 120, 121 and 122 can be similar to the compensating arrangement 36, with its modules 56, 67 and 58 (see FIG. 3).

The TV tuner 102 has an input 130 which receives (e.g., via a cable not shown) various TV channels being broadcast at radio frequency (RF) level. The tuner 102, after selecting a desired channel, applies to the preamplifier 104 at intermediate frequency (IF) level audio and video portions of a TV picture, which may or may not be scrambled. The preamplifier 104 applies the picture signals (video and audio) to the SAW filter 106 (well known in the art) which via a multiple lead 132 applies separated audio and video picture signals to the demodulator 108. The demodulator 108 applies the video part of the picture signals at baseband frequency level (see FIGS. 1 & 2) to the video amplifier 110. Audio signals at baseband level from the demodulator 108 may be applied via a separate signal path (not shown) to a TV receiver (not shown), as is well known. Baseband video signals from the video amplifier 110 are applied via a branched lead 134 to the compensating arrangement 112 and its respective modules 120, 121 and 122. Descrambled video signals from these modules 120, 121 and 122 are applied by a respective one of the leads 136, 137 and 138 to the multiplex (MUX) unit 114. An output of the multiplex (MUX) with 114 is applied to an input of the amplifier 116. Descrambled video signals from the amplifier 116, suitable for display on a TV receiver (not shown), are applied to an output 140. Signals from the amplifier 116 are applied via a lead 142 to the reference level unit 117 (well known in the art) where a "zero" reference level is established. The reference level unit 117 applies via a branched lead 143 a "zero" reference level to each of the modules 120, 121 and 122 and to the amplifier 116. The control unit 118 receives control signals (well known in the art) at an input 119 from the TV cable system central office via a path (not shown) relating to the scrambling and descrambling of the TV pictures being received by the circuit 100. The control unit 118 applies suitable control signals via a branched lead 144 to the MUX unit 114 and to the respective modules 120, 121 and 122 of the sync level compensating arrangement 112.

The circuit 100 operates in a way similar to that of the circuit 30, but with the following differences. In the circuit 100 audio signals are handled separately from video signals after the demodulator 108. Only line video signals are applied via the amplifier 110 to the compensating arrangement 112, and these signals are at baseband level. To enable the arrangement 112 to maintain a proper zero level and hence a standard ratio between the sync signals during HBI and the active video (AV) portion of each video line H, the amplifier 116 and each of the modules 120, 121 and 122 of the arrangement 112 are supplied with a "zero" reference signal via the branched lead 143 from the reference unit 117.

The module 120 of the arrangement 112, when activated by signals from the control unit 118 via the branched lead 114, applies a 0 dB loss (unity gain) selectively to a portion of each video line H on the branched lead 134. This only occurs during the HBI portion of a video line H having a sync pulse already suppressed by −10 dB. The module 120, after providing a 0 dB loss (unity gain) to this sync pulse, is then actuated during the AV portion of this line H by the control unit 118 to provide a −10 dB loss to the active video (AV) portion of the line H. Thus both the horizontal sync pulse and the AV portion of that line H appear attenuated equally by −10 dB. In other words, the sync pulse has been recovered by restoring to a standard ratio (no longer in IRE units) the peak sync pulse level relative to a reference zero level as compared to the peak level of the AV portion of the line H relative to the reference zero level. The video line H thus descrambled for proper viewing, though attenuated by −10 dB, is applied to the lead 136 at the output of the module 120 and thence to the MUX unit 114 which is also actuated by the control unit 118 to accept the signals on the lead 136. The module 120 can be a simple diode-resistor network as is well known in the art.

In similar fashion, where sync pulses are suppressed at the central office by −6 dB, the control unit 118 actuates the module 121 during the HBI of each line H, and the sync pulse (already suppressed by −6 dB) of the line H is further attenuated by −4 dB to give a total attenuation of −10 dB. The module 121 after providing a −4 dB loss during HBI, is actuated by the control unit 118 during the AV portion of that line H to provide a −10 dB loss to the active video (AV) portion of the line H. Thus the horizontal sync pulse and the active video (AV) portion of that line H both appear attenuated by −10 dB and are applied to the lead 137 and to the MUX unit 114 which is actuated to accept the signals on the lead 137. The module 121 can be a simple diode-resistor network as is well known in the art.

Where sync pulses are not suppressed (0 dB) at the central office, the control unit 118 actuates the module 122 during the HBI portion of a line H and the sync pulse of that line H is attenuated by −10 dB. The module 122 is then actuated by the control unit 118 during the AV portion of the line H to also provide −10 dB attenuation. The line H, attenuated with sync pulse and AV portion by −10 dB, is then applied to the lead 138 and to the MUX unit 114 which is actuated by the control unit 118 to accept the signals on the lead 138. The module 122 can be a diode-resistor network as is well known in the art.

The control unit 118 of the circuit 100 is closely similar to the control unit 38 (FIG. 3), and the compensating arrangement 112 is closely similar to the arrangement 36. The circuit 100 avoids certain drawbacks of the circuits 30 and 80 of FIGS. 3 and 4, respectively, by compensating for suppressed sync pulses at baseband level and only operating on video signals (audio signals being handled separately). However the circuit 100 requires additional elements (and added cost) and has gain and phase match problems pertaining to the amplifiers 110 and 116.

The above description of the prior-art circuits 30, 80 and 100 shows various difficulties in attempts made in the past to provide cost-effective descrambling systems having good efficiency and low distortion. It is seen from this description how prior systems, driven by the need to keep cost low, have been limited in one way or another with regard to avoiding added noise, distortions, or other artifacts which can be objectionable to the eye of a person viewing TV pictures descrambled by these systems. It will now easily be appreciated from the following description that the present invention avoids the deficiencies and limitations in performance which are described above yet provides cost-effective method and apparatus for descrambling TV pictures which have been scrambled by sync suppression.

Figure 6:
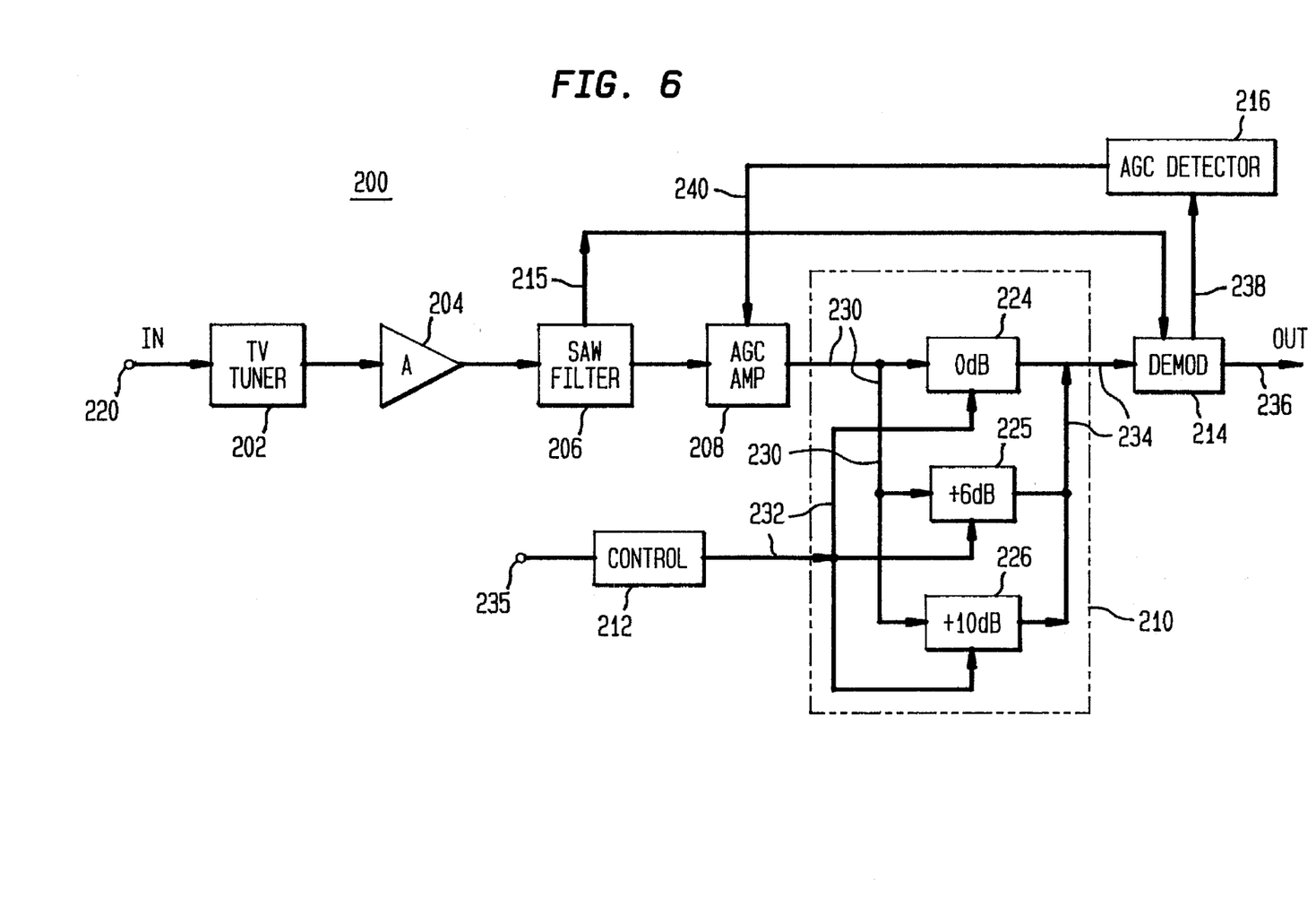
FIG. 6 is a schematic block diagram of an improved descrambling sync recovery circuit in accordance with the present invention.

Referring now to FIG. 6, there is shown a schematic block diagram of an improved sync recovery circuit 200 provided in accordance with the present invention. The circuit 200, which may be part of a receiver (not shown), comprises a TV tuner 202, a preamplifier (A) 204, a SAW filter 206, an automatic gain controlled (AGC AMP) amplifier 208, a sync pulse amplification arrangement 210 (shown within a dashed line box), a control unit 212, a demodulator (DEMOD) 214, and an automatic gain control (AGC DETECTOR) detector 216. Many but not all of these elements may be identical to corresponding ones in the prior-art circuits 30 and 80 which are shown in FIGS. 3 and 4. However, the arrangement and interconnection of elements in the circuit 200 (provided according to one aspect of the invention) and their method of operation (provided according to another aspect of the invention) are significantly different from those of prior-art circuits.

The TV tuner 202 has an input 220 which receives (e.g., via a cable not shown) various TV channels being broadcast at radio frequency (RF) level. The TV tuner 202, after selecting a desired channel, applies to the preamplifier 204 at intermediate frequency (IF) level audio and video portions of a TV picture, which may or may not be scrambled. The preamplifier 204 applies the picture signals (video and audio) to the SAW filter 206 (well known in the art). The SAW filter separates the audio from the video portion of the TV picture and applies, at IF level, the line video signals (without audio) to the AGC amplifier 208. The SAW filter 206 applies at IF level the audio portion of the TV picture via a path 215 to the demodulator 214 from which audio may be applied to a TV receiver (not shown), as is well known.

The amplification arrangement 210 comprises a module 224, a module 225, and a module 226. Each of modules 224, 225, and 226 receives line video signals (scrambled or not) at IF level via a branched lead 230 from the AGC amplifier 208. Each of the modules 224, 225 and 226 is selectively controlled via a branched lead 232 by signals from the control unit 212. Descrambled line video signals at IF level are outputted from the arrangement 210 via a common output lead 234 to the demodulator 214. Audio portions of a TV picture do not pass through the arrangement 210.

The control unit 212 (well known in the art) receives at an input 235 coded signals via a path (such as a cable, not shown) from a central office, which signals are sent along with the TV pictures to each subscriber location. These coded signals enable a respective circuit 200 to descramble (or not) those TV pictures for which access is authorized (or not). By way of example here, there are illustrated three levels of sync suppression, namely 0 dB (none), −6 dB, and −10 dB.

The modules 224, 225 and 226 of the arrangement 210 are selectively controlled by the control unit 212 as follows. When a line H of a video signal (at IF level) with its sync pulse not suppressed (0 dB) appears on the branched lead 230, the control unit 212 actuates the module 224 during the HBI portion of the line H to apply unity gain (0 dB) to the sync pulse (already at standard level). Then, during the AV portion of the line H, the control unit 212 actuates the module 224 to also provide unity gain (0 dB). Thus the module 224 passes onto the output common lead 234 the entire video signal line H at unity gain, the sync pulse not having been suppressed in the first place. Thereafter the "descrambled" line H is applied via the common lead 234 to the demodulator 214. The module 224 can be a unity gain amplifier well known in the art.

When a line H of a video signal has its sync pulse suppressed by −6 dB, the module 225 is actuated during HBI by the control unit 212 to apply +6 dB gain to the sync signal, but is actuated during the AV portion of the line H to apply unity gain (0 dB) to this portion of the line H. Thus the module 225 outputs to the common lead 234 a descrambled video line H with sync pulse restored to standard. The module 225 can be a 0 dB and a +6 dB controllable gain amplifier well known in the art.

Similarly, where a line H of a video signal has its sync pulse suppressed by −10 dB, the module 226 is actuated by the control unit 212 during HBI to provide a +10 dB gain, and is actuated during the AV portion of the line H to provide unity gain (0 dB). Thus a descrambled video signal line H is provided by the module 226 and applied to the common lead 234. The module 226 can be a 0 dB and +10 dB controllable gain amplifier well known in the art.

Descrambled line video signals are received by the demodulator 214 via the common lead 234, and audio signals are received from the SAW filter 206 via the path 215. Both the video and audio portions (at baseband level) of TV pictures are outputted from the demodulator 214 to an output 236 and can be displayed and heard on a standard TV receiver (not shown) as is well known. The demodulator 214 also supplies signals to the AGC detector 216 via a lead 238. The AGC detector 216 derives from the signals applied to it by the demodulator 214 gain control signals which the AGC detector 216 applies via a feedback loop 240 to the AGC amplifier 208. Thus the gain of the AGC amplifier 208 is automatically controlled so that its operation and that of the amplification arrangement 210 and the demodulator 214 are held within suitable limits. Thus added noise, distortion and other artifacts in the descrambled TV pictures produced by the circuit 200 are limited. Distortion which might otherwise be caused by passing both audio and video portions of the TV pictures through the amplification arrangement 212 of the circuit 200 is likewise limited. By descrambling video signals at the IF level in the circuit 200 there is no need for a separate reference level source with its associated problems (as in the circuit 100), and there are essentially no problems of gain and phase match. The circuit 200 is fully compatible with present-day cable (and other) TV systems.

The above description of the invention is intended in illustration and not in limitation thereof. Various modifications in the method and apparatus disclosed may occur to those skilled in the art and can be made without departing from the spirit and scope of the invention as set forth in the accompanying claims. For example, the invention is not limited to TV pictures solely in NTSC format, or to any particular IF level frequency. Still further, other circuit elements may be substituted for certain ones of the conventional elements, such as the SAW filter, etc., which are employed in the circuit 200. Still further, picture scrambling, such as video inversion (well known in the art) may also be employed along with sync suppression. Furthermore, the invention is not limited to any particular level or levels of sync suppression.

What is claimed is:

1. A method of recovering suppressed sync signals in scrambled TV pictures in order to descramble them, the method comprising the steps of:
    amplifying line video signals of TV pictures through a gain controlled amplifier;
    selectively compensating for suppressed levels of sync signals of the line video signals to the degree the sync signals have been suppressed to obtain operable levels of the sync signals;
    passing the line video signals with recovered sync signals of the TV picture through a demodulator; and
    providing a feedback signal from the demodulator to the gain controlled amplifier to automatically control its gain and thereby reduce artifacts in the TV pictures after sync recovery.

2. The method of claim 1 further comprising the steps of:
    separating at an intermediate frequency (IF) level audio from video portions of the TV pictures; and
    applying only the video portions of the TV pictures to the gain controlled amplifier while separately demodulating the audio portions.

3. A method of recovering suppressed sync signals in TV pictures comprising the steps of:
    separating a video portion having suppressed sync signals from an audio portion of a TV picture at an intermediate frequency level;
    amplifying the video portion through a gain controlled amplifier;
    selectively compensating for the suppressed levels of sync signals to obtain operable levels of the sync signals;
    passing the video portion with recovered sync signals of the TV picture through a demodulator; and
    providing a feedback signal from the demodulator to the gain controlled amplifier to automatically control its gain and thereby reduce artifacts in the TV pictures after sync recovery.

4. The method of claim 3 wherein the suppressed sync signals are selectively compensated for by amplifying them to the degree they have been suppressed such that no added amplification noise is introduced into the TV picture by recovery of the sync signals.

5. The method of claim 4 further comprising the step of selectively actuating a plurality of variable gain amplifiers to compensate for different levels of sync suppression.

6. Apparatus for recovering suppressed sync signals in TV pictures comprising:
    filter means for separating a video portion having suppressed sync signals from an audio portion of a TV picture at an intermediate frequency level;
    gain controlled amplifier means coupled to the filter means to receive the video portion of the TV pictures;
    sync recovery means coupled to the amplifier means for selectively restoring to operating levels the suppressed levels of sync signals;
    demodulator means coupled to the sync recovery means to receive the video portion with recovered sync signals of the TV picture; and
    feedback means for providing a feedback signal from the demodulator means to the amplifier means to automatically control gain and thereby minimize artifacts in the TV pictures after sync recovery.

7. The apparatus of claim 6 wherein the sync recovery means selectively amplifies suppressed sync signals to the degree they have been suppressed.

8. The apparatus of claim 7 wherein the sync recovery means comprises a plurality of selectable gain amplifiers to compensate respectively for different levels of sync suppression.

9. Apparatus for recovering suppressed sync signals in scrambled TV pictures in order to descramble them, the apparatus comprising:
    gain controlled amplifier means coupled to receive line video signals of TV pictures for outputting the video portion at optimum levels of gain;
    sync recovery means coupled to the amplifier means for selectively compensating for suppressed levels of sync signals of the line video signals to the degree the sync signals have been suppressed to obtain operable levels of the sync signals;
    demodulator means coupled to the sync recovery means for receiving the line video signals with recovered sync signals of the TV picture; and
    feedback means for providing a feedback signal from the demodulator means to the gain controlled amplifier means to automatically control its gain and thereby minimize artifacts in the TV pictures after sync recovery.

10. Apparatus for recovering suppressed sync signals in scrambled TV pictures in order to descramble them, the apparatus comprising:
    tuner means for selecting a desired TV channel and for outputting TV pictures of the channel at an intermediate frequency (IF) level;

filter means coupled to the tuner means for separating a video portion having suppressed sync signals from an audio portion of the TV picture at the IF level;

gain controlled amplifier means coupled to the filter means to receive the video portion of the TV pictures for outputting the video portion at optimum levels of gain;

sync recovery means coupled to the amplifier means for selectively amplifying the sync signals to the degree they have been suppressed to obtain operable levels of the sync signals;

control means coupled to receive coded signals identifying suppressed sync signals and coupled to the sync recovery means for controlling the selective amplification of the sync signals;

demodulator means coupled to the sync recovery means for demodulating the video portion with recovered sync signals of the TV picture; and feedback means for providing a feedback signal from the demodulator means to the amplifier means to automatically control gain and thereby minimize artifacts in the TV pictures after sync recovery.

11. The apparatus of claim 10 wherein the sync recovery means comprises a plurality of selectable gain amplifiers to compensate respectively for different levels of sync suppression.

12. The apparatus of claim 10 wherein the filter means comprises a surface acoustic wave (SAW) filter, and the demodulator means is coupled to the SAW filter to receive the audio portion of the TV picture.

* * * * *